(12) United States Patent
Blomstrand et al.

(10) Patent No.: US 12,168,487 B2
(45) Date of Patent: Dec. 17, 2024

(54) PROPULSION ARRANGEMENT FOR SELF-POWERED DOLLY VEHICLE UNITS

(71) Applicant: VOLVO TRUCK CORPORATION, Gothenburg (SE)

(72) Inventors: Jesper Blomstrand, Härryda (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 566 days.

(21) Appl. No.: 17/451,392

(22) Filed: Oct. 19, 2021

(65) Prior Publication Data

US 2022/0126934 A1   Apr. 28, 2022

(30) Foreign Application Priority Data

Oct. 22, 2020   (EP) ..................................... 20203295

(51) Int. Cl.
*B62D 59/02* (2006.01)
*B60L 7/10* (2006.01)
*B60L 15/32* (2006.01)

(52) U.S. Cl.
CPC ................. *B62D 59/02* (2013.01); *B60L 7/10* (2013.01); *B60L 15/32* (2013.01); *B60L 2200/28* (2013.01)

(58) Field of Classification Search
CPC ..................................................... B62D 59/02
See application file for complete search history.

(56) References Cited

U.S. PATENT DOCUMENTS

| | | | |
|---|---|---|---|
| 6,364,806 B1 | 4/2002 | Spaniel | |
| 8,939,250 B2 * | 1/2015 | Turner | B62D 59/04 180/312 |
| 10,384,527 B2 | 8/2019 | Frank et al. | |
| 2014/0116201 A1 | 5/2014 | Spiegel et al. | |
| 2018/0304944 A1 * | 10/2018 | Wright | B62D 53/08 |
| 2018/0345952 A1 * | 12/2018 | Layfield | B60L 15/2009 |
| 2019/0118639 A1 | 4/2019 | Hata et al. | |
| 2020/0122715 A1 | 4/2020 | Ayfield et al. | |
| 2023/0312029 A1 * | 10/2023 | Layfield | B60D 1/015 180/6.5 |

FOREIGN PATENT DOCUMENTS

| | | | | |
|---|---|---|---|---|
| CN | 108173388 A | 6/2018 | | |
| WO | WO-2017080571 A1 * | 5/2017 | ............... | B60K 1/02 |
| WO | WO-2020025775 A1 * | 2/2020 | ............... | B60K 1/02 |

OTHER PUBLICATIONS

European Search Report dated Mar. 17, 2021 in corresponding European Patent Application No. 20203295.9, 10 pages.
European Communication pursuant to Article 94(3) EPC dated Dec. 15, 2023 in corresponding European Patent Application No. 20203295.9, 8 pages.

* cited by examiner

*Primary Examiner* — Tony H Winner
*Assistant Examiner* — Hosam Shabara
(74) *Attorney, Agent, or Firm* — Venable LLP; Jeffri A. Kaminski

(57) ABSTRACT

A propulsion arrangement for a self-powered dolly vehicle unit, the propulsion arrangement comprising a first electric machine, a second electric machine, a gearbox, and an open differential for driving first and second wheels of a driven axle, wherein the first and second electric machines are arranged in parallel and connected to the open differential via the gearbox at respective gear ratios.

13 Claims, 5 Drawing Sheets

PROPULSION ARRANGEMENT FOR SELF-POWERED DOLLY VEHICLE UNITS

TECHNICAL FIELD

The present disclosure relates to heavy-duty vehicles such as semi-trailer vehicles for cargo transport, and in particular to self-powered dolly vehicles comprising an energy source configured to power various dolly vehicle functions such as steering, propulsion and braking. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

U.S. Pat. No. 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

However, there is a need for further development and optimization of self-powered dolly vehicles in order to improve performance over a wide span of driving scenarios where self-powered dolly vehicles may be used to boost overall vehicle performance.

SUMMARY

It is an object of the present disclosure to provide electrified dolly vehicle units with improved propulsion arrangements which allow higher performance over a wide range of vehicle speeds.

This object is at least in part achieved by a propulsion arrangement for a self-powered dolly vehicle unit. The propulsion arrangement comprises a first electric machine, a second electric machine, a gearbox, and an open differential for driving first and second wheels of a driven axle. The first and second electric machines are arranged in parallel and connected to the open differential via the gearbox at respective gear ratios. This arrangement with two motors arranged in parallel to power a driven axle via a gearbox and an open differential provides great flexibility for supporting both startability of a combination vehicle and also operation at higher vehicle speeds, such as for highway cruising.

According to aspects, the first electric machine is associated with a fixed gear ratio and the second electric machine is associated with a configurable gear ratio. By allowing for a change of gears of at least one of the electric machines, the propulsion arrangement can be further adapted to support both starting from stand-still and highway driving scenarios in an efficient manner, which is an advantage. For instance, the configurable gear ratio of the second electric machine can be made selectable between a second gear ratio and a third gear ratio. This allows for a design with a relatively low complexity control unit which controls the gearbox to switch gears for the second electric machine in dependence driving scenario. The control unit may for instance be arranged to set the configurable gear ratio of the second electric machine in dependence of an electric machine axle speed of the second electric machine and/or in dependence of a vehicle speed of the dolly vehicle unit. The dolly vehicle unit speed can be measured with wheel speed sensors on the dolly, which means that the control of the dolly vehicle unit gears can advantageously be performed in a stand-alone manner independent from the control of the prime mover. However, additional advantages may be obtained if the control of the dolly vehicle unit is coordinated with that of the prime mover and also that of other vehicle units in the vehicle combination.

Advantageously, the first and second electric machines and the gearbox can be integrally formed as a single module. This single module simplifies dolly vehicle assembly.

According to aspects, the propulsion arrangement comprises an electrical energy source. The first and the second electric machines may then be configurable in a propulsion mode of operation where positive torque is generated and power from the energy source is consumed, and in a regenerative braking mode of operation where negative torque is generated and power is fed to the energy source, thereby replenishing the energy source. The gearbox may thus be used to optimize both propulsion and braking by selecting a suitable gear ratio for the operation at hand.

There is also disclosed control units, methods and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
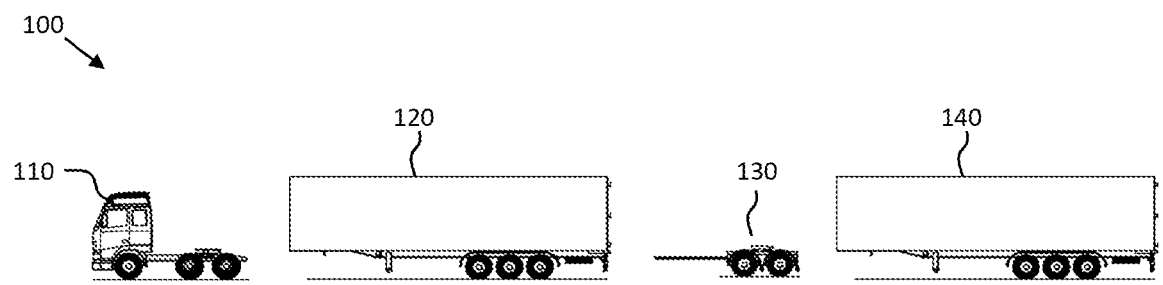
FIG. 1 shows an example vehicle combination comprising a dolly vehicle unit.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle combination 100 for cargo transport. The vehicle combination 100 comprises a truck or towing vehicle 110, i.e., a prime mover, configured to tow a first trailer unit 120 in a known manner, e.g., by a fifth wheel connection. To extend the cargo transport capability of the vehicle combination 100, a dolly vehicle 130 can be connected to the rear of the first trailer 120 via a drawbar. This dolly vehicle can then tow a second trailer 140, thus increasing the cargo transport capacity of the vehicle combination.

A dolly vehicle 130 is traditionally a passive vehicle comprising no driven or steerable axles, and with a relatively short wheelbase. It has recently been shown that self-powered steerable dolly vehicles may provide both increased fuel efficiency and maneuverability. This type of self-powered dolly vehicle comprises an on-board energy source, such as a battery, super-capacitor or a fuel cell stack, and at least one pair of driven wheels.

Increased fuel efficiency is for instance obtained if an electric machine arranged for regenerative braking along with a battery or super-capacitor is installed in the dolly vehicle. The vehicle combination then effectively becomes a hybrid electric vehicle, even if the towing vehicle only comprises a traditional diesel engine with no on-board electric hybridization. An example of this type of self-powered dolly vehicle will be discussed in more detail below in connection to, e.g., FIGS. 3A and 3B.

Adding a self-powered dolly vehicle 130 to the vehicle combination 100 can also improve startability, since the dolly vehicle is then able to generate extra torque when bringing the vehicle combination into motion from a stand-still. Vehicle startability may be a limiting factor in the maximum load possible to carry, and a self-powered dolly vehicle may therefore contribute to an increased cargo capacity, which is an advantage.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor, fuel cell or other device arranged to store electrical energy. However, an energy source may also comprise mechanical energy storage devices such as springs and compressed air tanks for pneumatic machines. Combinations of different types of energy sources can also be used. A traditional fuel tank for storing gasoline or diesel fuel can of course also be considered an energy source in this context. The present disclosure, however, focuses on propulsion arrangements based on electric machines powered by a battery.

Figure 2:
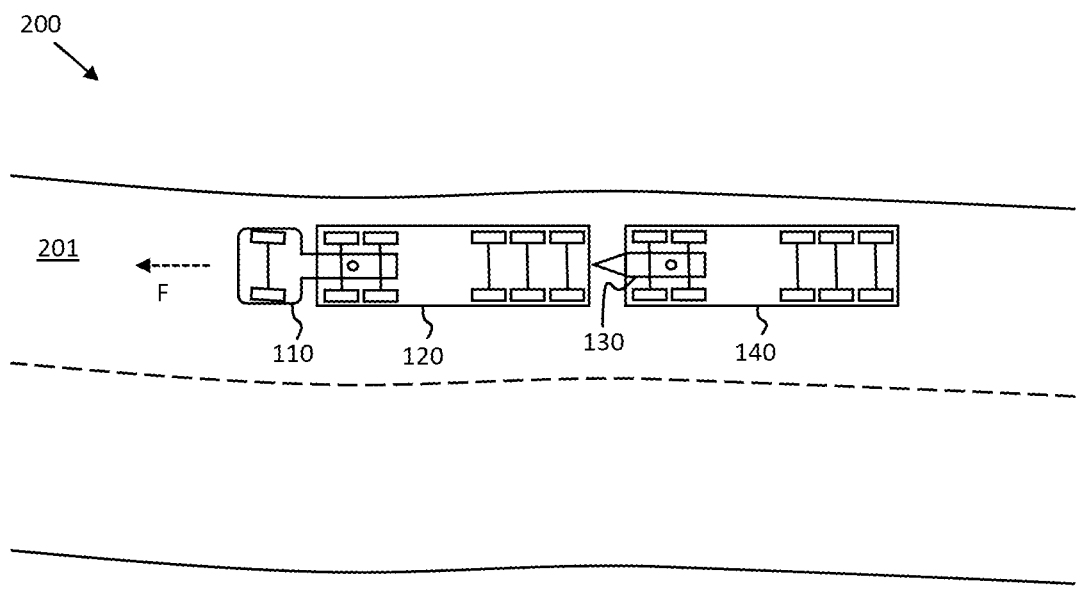
FIG. 2 schematically illustrates a vehicle combination in a driving scenario.

FIG. 2 illustrates a driving scenario 200 where a vehicle combination comprising a dolly vehicle unit 130 is driving in a forward direction F on a relatively flat road 201. If the dolly vehicle is self-powered, it can support the tractor 110 in generating propulsive force for cruising along the road at an even speed on the order of, say 110 km/h or so. This driving scenario requires a relatively low amount of torque to be generated in comparison to the torque required for bringing a heavy vehicle into motion from stand-still. However, the torque needs to be generated at high axle speed, which may be a challenge for some electrical machines where the torque generating ability often declines with axle speeds.

Thus, it is desired to be able to generate large amounts of torque at low vehicle speeds for improved startability, and also to be able to generate a sufficient torque at higher engine speeds in order to support, e.g., highway cruising and the like. A purpose of the present disclosure is to provide propulsion arrangements for dolly vehicle units which are flexible enough to generate required torque levels over w wide range of axle speeds, from stand-still up to cruising speeds.

Figure 3A:
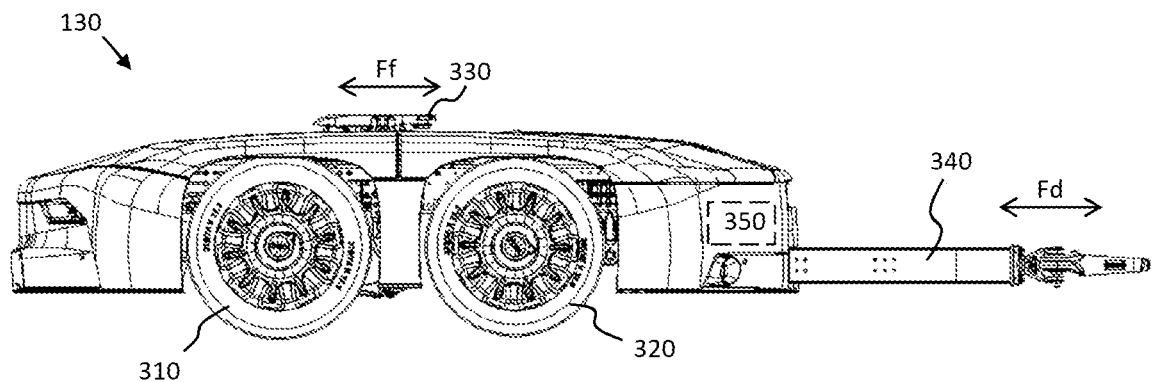
FIGS. 3A, 3B illustrate example dolly vehicle units.
Figure 3B:
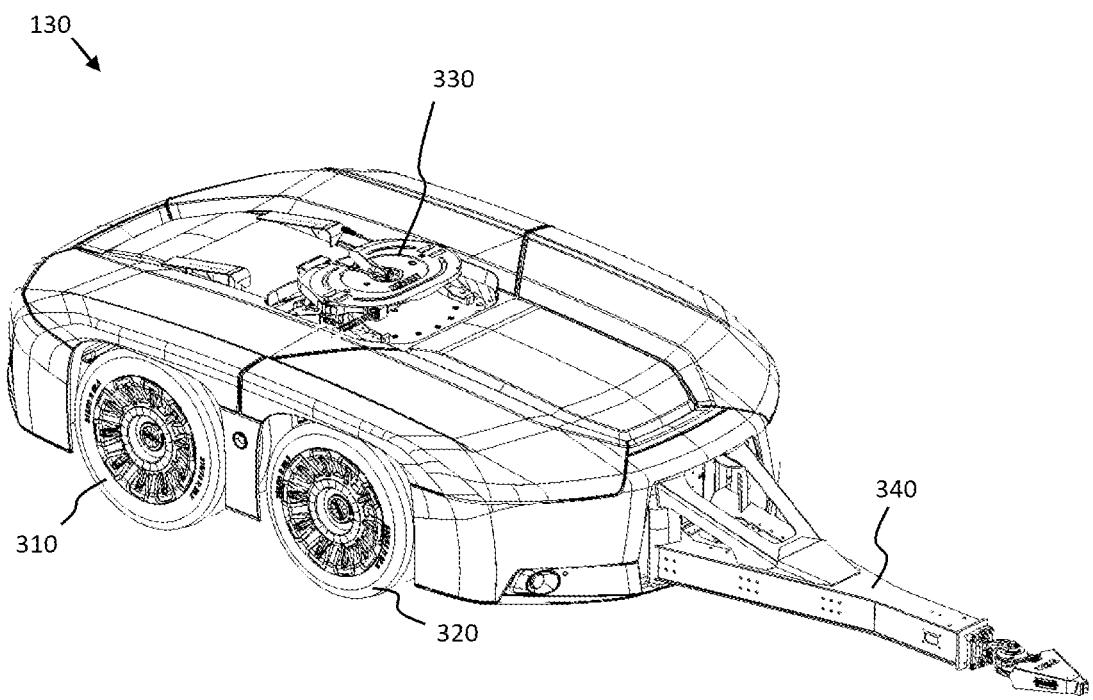
Figure 4:
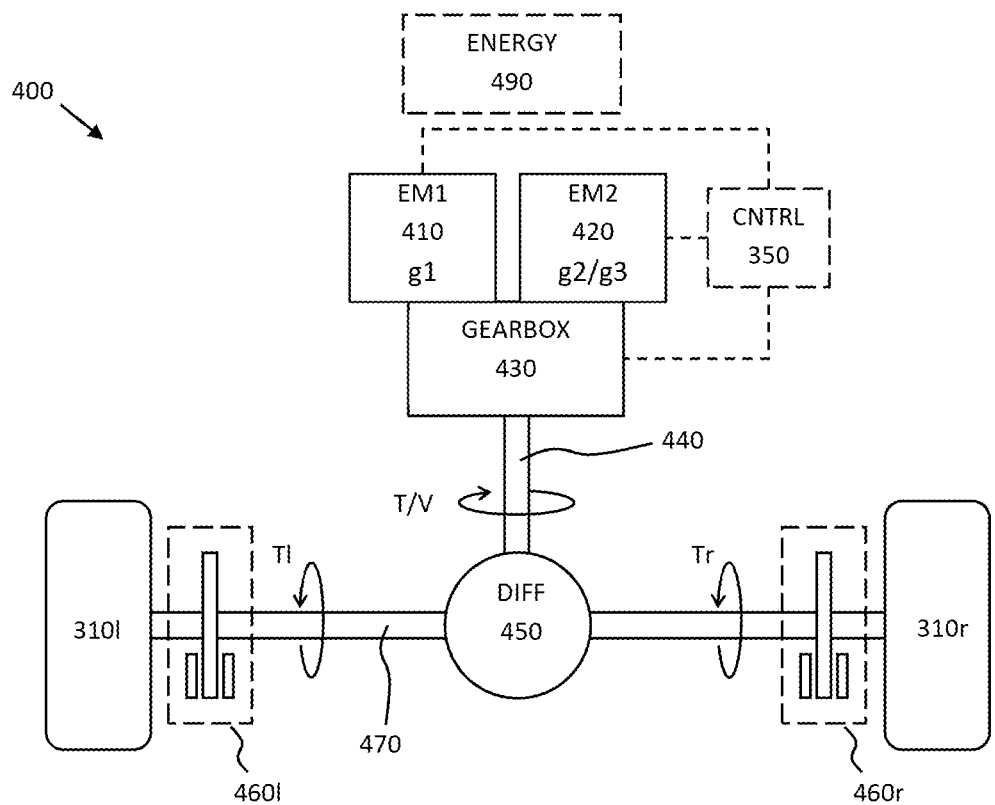
FIG. 4 schematically shows a propulsion arrangement for a dolly vehicle.

FIGS. 3A and 3B illustrate an example dolly vehicle unit 130 comprising rear wheels 310 and front wheels 320, as well as a fifth wheel connection 330 and a drawbar 340. The drawbar in FIG. 3A represents one example drawbar, and the drawbar in FIG. 3B represents another example drawbar which has additional supporting members for increased mechanical strength. The dolly vehicle 130 is self-powered by a propulsion arrangement which is schematically shown in FIG. 4. The propulsion arrangement may, generally, power one or both axles on the dolly, although a single driven axle is shown in FIG. 4.

The dolly vehicle unit 130 is arranged to be connected to a truck or towing trailer unit via the drawbar 340. This connection is associated with a longitudinal force Fd. This force will be positive, i.e., an accelerating pull force acting on the dolly in case the vehicle combination is accelerating, and a negative force, i.e., a braking force, in case the vehicle combination is slowing down. A similar force Ff will be generated at the fifth wheel connection 330 in the longitudinal direction of the dolly.

The dolly may also comprise a control unit 350 configured to control various functions on the dolly, such as generated torque by the propulsion arrangement, braking, steering, and so on. This control unit will be discussed in more detail below in connection to FIG. 8.

FIG. 4 schematically shows a propulsion arrangement 400 for a self-powered dolly vehicle unit 130. The propulsion arrangement comprises a first electric machine 410, a second electric machine 420 and a gearbox 430. The gearbox output shaft 440 is connected to an open differential 450 which drives first and second wheels 310l, 310r of the driven axle 470 on the dolly vehicle unit 130. Thus, the first and second electric machines are connected in parallel to the same drive axle 470 via the gearbox. Since the first 410 and second 420 electric machines are arranged in parallel and connected to the same drive axle, the torques generated by the two machines will sum up after accounting for respective gear ratios to generate a sum torque T and an axle rotational velocity V. The open differential allows for speed differences across the two wheels in a known manner. The primary function of the open differential is to split torque TI, Tr between the two wheels 310l, 310r.

The gearbox is arranged to connect the electric machines to the open differential 430 at respective gear ratios g1, g2, g3. These gear ratios are configured such as to improve startability performance while at the same time being able to deliver sufficient torque at higher axle speeds.

It is appreciated that the first electric machine 410 and the second electric machine 420 can be configured with equal torque vs machine axle speed characteristics, i.e., the first and the second electric machine can be the same type of electric machine. However, in some cases it may be beneficial to configure the second electric machine 420 to generate a larger axle torque compared to the first electric machine 410 in a low speed range extending from zero rpm to about 500 rpm. This way the second electric machine will mainly contribute to supporting startability, while the first electric machine mainly contributes to supporting higher speed driving.

The propulsion arrangement 400 also comprises a rechargeable electrical energy source 490, such as a battery or a super-capacitor. The first and the second electric machines 410, 420 can then be configurable in a propulsion mode of operation where positive torque is generated and power from the energy source is consumed, and in a regenerative braking mode of operation where negative torque is generated and power is fed to the energy source. Of course, the electrical machines 410, 420 may also at least in part be powered by a fuel cell stack or the like.

FIG. 4 also shows service brakes 460l, 460r arranged to brake the wheels in case the regenerative braking capacity should prove insufficient.

Figures 5A, 5B:
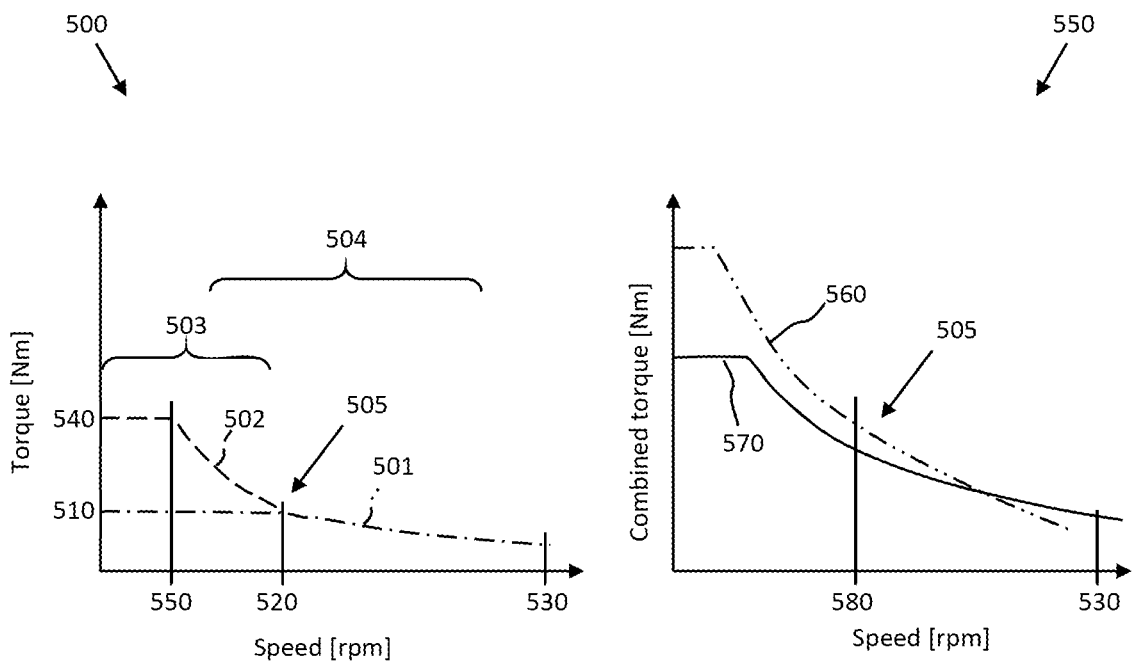
FIGS. 5A,5B are graphs showing torque in Nm vs engine speed in rpm.

FIGS. 5A and 5B are graphs 500, 550 of generated torque in Newton-meters (Nm) vs gearbox output shaft rotation speed in revolutions per minute (rpm). The torque curve of the first electric machine in graph 500 is shown as a dash-dotted curve 501, while the torque curve of the second electric machine is shown as a dashed curve 502. The sum of the two torques on the output shaft of the gearbox is illustrated in graph 550 as function of the same output shaft speed. Here, the solid line 570 shows torque generated during continuous drive while the dash-dotted line 560 shows generated torque during intermittent drive.

There is a first range of axle speeds 503 shown in FIG. 5A which may range from standstill, i.e., 0 rpm up to about 1000-1500 rpm. This range indicates torque generated during vehicle start from standstill and operation in low speed driving scenarios, such as maneuvering at low speeds at a cargo facility or the like. It is important to achieve high torque in this region to be able to, e.g., bring heavily loaded vehicles into motion, and to allow robust vehicle handling in uphill driving scenarios. There is also a second range of output shaft speeds 504 which may range from about 1000 rpm or so and upwards to about 3500 rpm. This high speed range indicates the torques which can be generated in driving scenarios such as highway cruising and the like, where a relatively high constant velocity is to be maintained but where less torque is required.

The first electric machine 410 may be associated with a fixed gear ratio g1 and the second electric machine 420 may be associated with a configurable gear ratio g2, g3. This provides great flexibility when it comes to optimizing performance over a wider range of vehicle speeds, such as from a standstill condition, i.e., vehicle startability, to highway cruising at higher speeds, e.g., on the order of 110 km/h or so. To provide cruising capability, the fixed gear ratio g1 of the first electric machine 410 can be a first gear ratio g1 configured between 3:1 and 5:1, and preferably about 3.66:1. This way the first electric machine provides torque over a wide range of vehicle speeds, e.g., corresponding to a range of motor speeds from 0 rpm to about 3250 rpm.

With reference to FIG. 5A, the maximum torque generated by the first electric machine 410 is indicated as 510. This torque is maintained at a constant level up to a speed 520 where the torque starts to decline slowly up to some maximum speed 530. It is noted that the rate of decline is not overly dramatic, hence a significant portion of the torque is generated also in the high speed range 504.

The configurable gear ratio g2,g3 of the second electric machine 420 is optionally selectable between a second gear ratio g2 and a third gear ratio g3. The second gear ratio g2 can be chosen relatively low, such as between 3:1 and 5:1, and preferably about 3.524:1, i.e., similar to that of the first electric machine 410. At this gear ratio, the second electric machine performs almost the same in terms of torque vs speed as the first electric machine. This means that the sum of the two electric machine torques provide sufficient torque for supporting vehicle motion up to relatively high vehicle speeds. The third gear ratio g3 is preferably selected at a higher value, e.g., between 9:0 and 10:1, and preferably about 9.27:1. This gear ratio implies a significantly higher generated torque at low speeds, as indicated by the dashed curve in FIG. 5A. The configurable gear ratio of the second electric machine can be manually or automatically switched at a suitable shaft speed 505, e.g., at about 1250 rpm or so.

It is appreciated that the gearbox 430 may be arranged to provide more than one gear for the first electric machine 410, and more than two gears for the second electric machine 420. This leads to a more complicated gearbox, but also provides further options for optimizing dolly vehicle propulsion and regenerative braking.

According to some aspects, the propulsion arrangement 400 also comprises a control unit 350 arranged to set the configurable gear ratio g2, g3 of the second electric machine 420 in dependence of an electric machine axle speed of the second electric machine and/or in dependence of a vehicle speed of the dolly vehicle unit 130. The vehicle speed of the dolly can be measured directly on the dolly wheels using wheel speed sensors. Thus, the control of the gears can be controlled independently from a control of the truck or towing vehicle 110. However, additional benefits may be obtained if the prime mover is allowed to control the different motion support devices on the dolly vehicle unit.

The truck 110 (and possibly also on the trailers 120, 140) may comprise control units arranged to perform advanced vehicle motion management (VMM) functions. Such a function may, e.g., comprise global force generation to obtain some vehicle behavior, and coordination of motion support devices (MSDs) such as brakes and propulsion devices throughput the combination vehicle. Generally, the vehicle combination control may be arranged according to a layered functional architecture where some functions may be comprised in a traffic situation management (TSM) function layer and some other functions may be comprised in a VMM function layer. The TSM layer may plan vehicle operation with a time horizon of, e.g., 10 seconds. This time frame corresponds to, e.g., the time it takes for the vehicle 100 to negotiate a curve. The vehicle maneuvers planned and executed by the TSM function can be associated with acceleration profiles and curvature profiles. The TSM function layer continuously requests the desired acceleration profiles and curvature profiles from the VMM function layer.

The VMM function layer operates with a time horizon of about 1 second or so, and continuously transforms the acceleration profiles and curvature profiles into control commands for the various MSD functions on the vehicle, i.e., it among other things performs MSD coordination. One such MSD function may be the propulsion, braking, and steering functions of the dolly vehicle unit 130. Thus, the dolly vehicle units disclosed herein may be arranged to be communicatively coupled to a main control unit of the vehicle combination 100.

With reference again to FIGS. 5A and 5B, the maximum torque 510 of the first electric machine 410 may be on the order of 1000 Nm, which remains constant up to a speed 520 of about 1250 rpm. Torque is, however, delivered by the first electric machine 410 up to a maximum speed 530 of at least 3500 rpm. The maximum torque 540 generated by the second electric machine 420 may be on the order of 2500 Nm. This maximum torque is maintained at a constant level up to a speed 550 of about 500 rpm where it starts to decline relatively fast.

When the torques of the first and the second electric machines are combined, the generated torque is at a high level 570 in the low speed range 503 for supporting start-ability and low speed maneuvering, and maintained at a reasonable level all the way up to the maximum speed 530. A gearshift 505 may take place approximately at the speed 580 indicated in FIG. 5B, this speed may be on the order of 1250 rpm.

Figure 6:
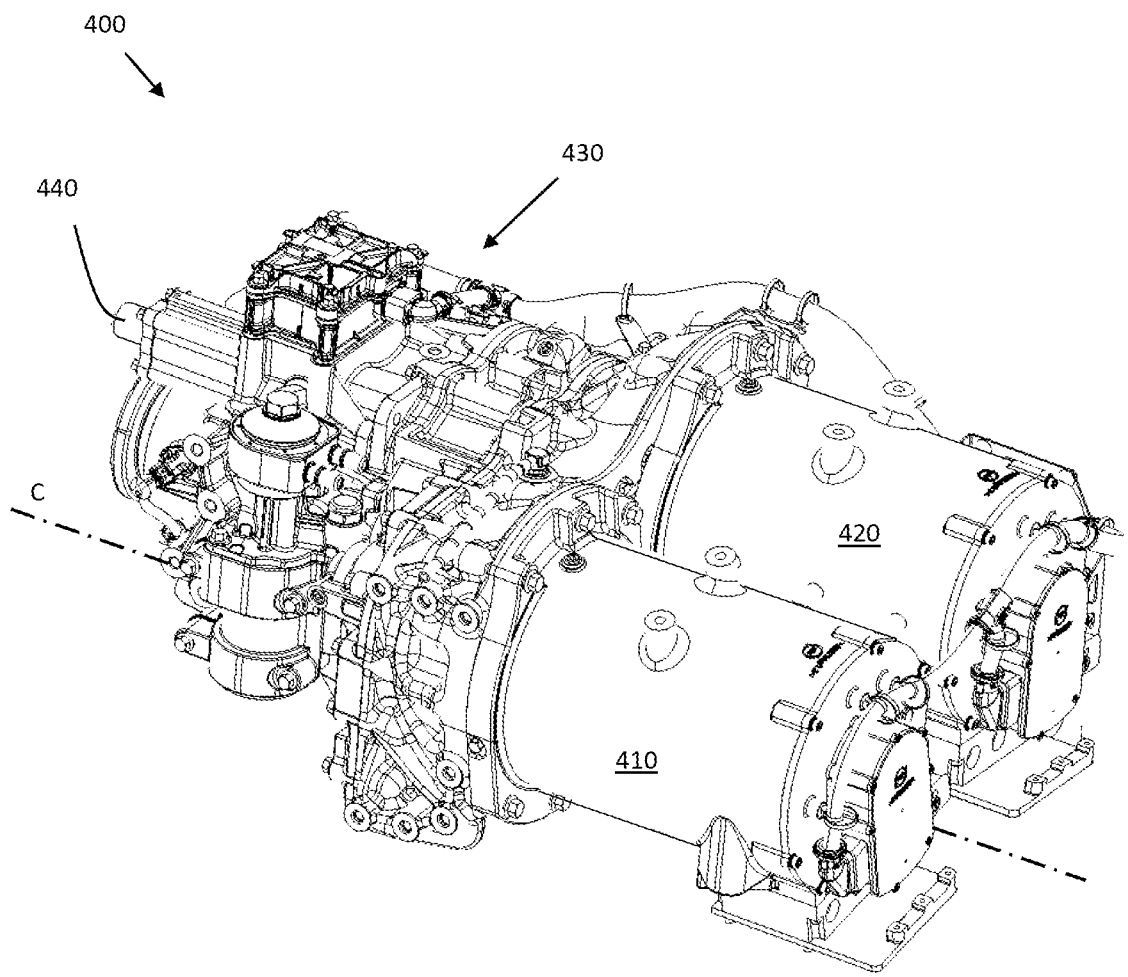
FIG. 6 shows an example propulsion arrangement for a dolly vehicle.

FIG. 6 shows an example of a dolly vehicle propulsion module 400, where the first and second electric machines 410, 420 and the gearbox 430 have been integrally formed as a single module. The two electric machines 410, 420 are arranged on either side of a longitudinal centrum line C of the module, where they interface with the gearbox 430. An output shaft 440 of the gearbox can be seen extending in a direction aligned with the centrum line C. This integrally formed module conserves space and simplifies dolly vehicle unit assembly. This is an advantage since space is limited in the relatively small dolly vehicle unit.

Figure 7:
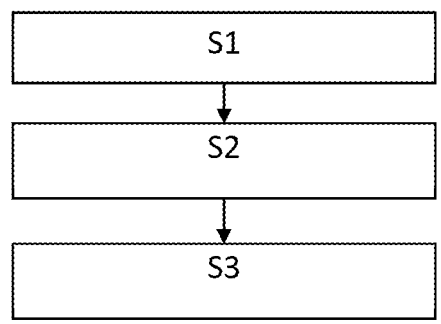
FIG. 7 is a flow chart illustrating methods.

FIG. 7 is a flow chart illustrating a method for operating a self-powered dolly vehicle unit 130. The method comprises configuring S1 a propulsion arrangement 400 for the self-powered dolly vehicle unit 130 comprising a first electric machine 410, a second electric machine 420, a gearbox 430, and an open differential 450 for driving first and second wheels 310l, 310r of a driven axle 470, i.e., a propulsion arrangement according to the discussion above. The first 410 and second 420 electric machines are arranged in parallel and connected to the open differential 430 via the gearbox 430 at respective gear ratios g1, g2, g3. The first electric machine 410 is associated with a fixed gear ratio g1 and the second electric machine 420 is associated with a configurable gear ratio g2, g3. The method further comprises determining S2 if the dolly vehicle unit 130 is in a low speed range of operation 503 or in a high speed range of operation 504, and setting S3 the configurable gear ratio g2, g3 of the second electric machine in dependence of the low or high speed range of operation. The determining of the speed range, i.e., whether the dolly vehicle is operating in the low speed range or in the high speed range can be based on wheel speed sensors and/or on axle speed sensors.

As mentioned in connection to FIG. 3A, longitudinal forces are generated at the drawbar 340 and at the fifth wheel connection 30. The method may also comprise determining this longitudinal force Fd associated with the drawbar 340 of the dolly vehicle unit 130 and/or the longitudinal force Ff associated with the fifth wheel connection 330 of the dolly vehicle unit 130, and controlling the electric machines 410, 420 and/or the gearbox 430 in dependence of the longitudinal force Fd, Ff. The control unit 350 is thus able to act in a stand-alone manner to support the various operations by the vehicle combination 100. If the vehicle is to be brought into motion from a stand-still, the control unit 350 can detect this by monitoring, e.g., wheel speed sensors and the longitudinal drawbar force. The control unit then selects the appropriate gear for the second electric machine 420 in order to generate the maximum torque 540. As the speed of the vehicle combination increases, the control unit eventually switches gear of the second electric machine into a gear more suitable for supporting high speed driving.

Figure 8:
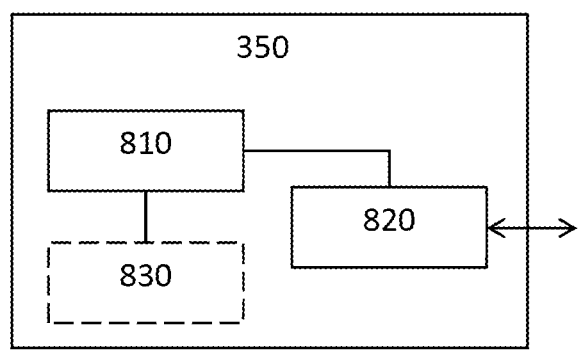
FIG. 8 schematically illustrates a control unit.

FIG. 8 schematically illustrates, in terms of a number of functional units, the components of a control unit 470 according to embodiments of the discussions and methods disclosed herein. This control unit 470 may be comprised in the vehicle 130, e.g., in the form of a vehicle motion management (VMM) function unit configured to perform force allocation and the like. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 470 to perform a set of operations, or steps, such as the methods discussed in connection to FIG. 10. For example, the storage medium 830 may store the set of operations, and the processing circuitry 810 may be configured to retrieve the set of operations from the storage medium 830 to cause the control unit 470 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 470 may further comprise an interface 820 for communications with at least one external device, such as an electric machine or a gearbox. As such the interface 820 may comprise one or more transmitters and receivers, comprising analogue and digital components and a suitable number of ports for wireline or wireless communication.

The processing circuitry 810 controls the general operation of the control unit 470, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
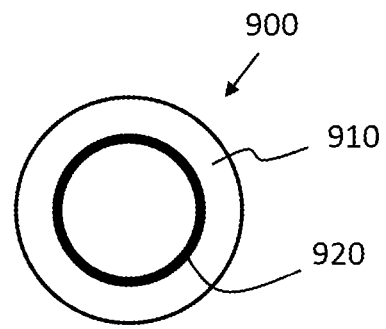
FIG. 9 shows an example computer program product.

FIG. 9 illustrates a computer readable medium 910 carrying a computer program comprising program code means 920 for performing, e.g., the methods illustrated in FIG. 7, when said program product is run on a computer. The computer readable medium and the code means may together form a computer program product 900.

The invention claimed is:

1. A propulsion arrangement for a self-powered dolly vehicle unit, the propulsion arrangement comprising a first electric machine, a second electric machine, a gearbox, and an open differential for driving first and second wheels of a driven axle, wherein the first and second electric machines are arranged in parallel and connected to the open differential via the gearbox at respective gear ratios, wherein the first electric machine is associated with a fixed gear ratio, and the second electric machine is associated with a configurable gear ratio, wherein
   the propulsion arrangement further comprises a control unit arranged to determine if the dolly vehicle unit is in a low speed range of operation or in a high speed range of operation, configured to set the configurable gear ratio of the second electric machine in dependence of the low or high speed range of operation and configured to driving the wheels of the self-powered dolly vehicle unit by the motors, wherein a low speed range of operation entails a wheel rotational speed of less than 1000 rpm and a high speed range of operation entails a wheel rotational speed of more than 1000 rpm.

2. The propulsion arrangement according to claim 1, wherein the fixed gear ratio of the first electric machine is a first gear ratio configured between 3:1 and 5:1.

3. The propulsion arrangement according to claim 1, wherein the configurable gear ratio of the second electric machine is selectable between a second gear ratio and a third gear ratio.

4. The propulsion arrangement according to claim 3, wherein the second gear ratio is between 3:1 and 5:1.

5. The propulsion arrangement according to claim 3, wherein the third gear ratio is between 9:0 and 10:1.

6. The propulsion arrangement according to claim 1, wherein the control unit is arranged to set the configurable gear ratio of the second electric machine in dependence of an electric machine axle speed of the second electric machine and/or in dependence of a vehicle speed of a vehicle in which the propulsion arrangement is comprised.

7. The propulsion arrangement according to claim 1, wherein the first and the second electric machine are the same type of electric machine such that the first electric machine and the second electric machine are configured with equal torque vs machine axle speed characteristics.

8. The propulsion arrangement according to claim 1, comprising an electrical energy source, wherein the first and the second electric machines are configurable in a propulsion mode of operation where positive torque is generated and power from the energy source is consumed, and in a regenerative braking mode of operation where negative torque is generated and power is fed to the energy source.

9. The propulsion arrangement according to claim 1, wherein the first and second electric machines and the gearbox are integrally formed as a single module.

10. A self-powered dolly vehicle unit comprising a propulsion arrangement according to claim 1.

11. A method for operating a self-powered dolly vehicle unit, the method comprising configuring a propulsion arrangement for the self-powered dolly vehicle unit comprising a first electric machine, a second electric machine, a gearbox, and an open differential for driving first and second wheels of a driven axle, wherein the first and second electric machines are arranged in parallel and connected to the open differential via the gearbox at respective gear ratios, wherein the first electric machine is associated with a fixed gear ratio and wherein the second electric machine is associated with a configurable gear ratio, the method further comprising determining if the dolly vehicle unit is in a low speed range of operation or in a high speed range of operation, and setting the configurable gear ratio of the second electric machine in dependence of the low or high speed range of operation, driving the wheels of the self-powered dolly vehicle unit by the motors, wherein a low speed range of operation entails a wheel rotational speed of less than 1000 rpm and a high speed range of operation entails a wheel rotational speed of more than 1000 rpm.

12. The method according to claim 11, comprising determining a longitudinal force associated with a drawbar of the dolly vehicle unit and/or a longitudinal force associated with a fifth wheel connection of the dolly vehicle unit, and controlling the electric machines and/or the gearbox in dependence of the longitudinal force.

13. A control unit comprising processing circuitry configured to perform a method according to claim 11.

* * * * *